Nov. 29, 1949     W. D. HOOPER     2,489,776
WEIGHT CONTROLLED CONTAINER FILLING DEVICE
Filed July 16, 1945

Inventor:
William D. Hooper,
By Dawson, Ooms & Booth,
Attorneys.

Patented Nov. 29, 1949

2,489,776

UNITED STATES PATENT OFFICE 2,489,776

WEIGHT CONTROLLED CONTAINER FILLING DEVICE

William D. Hooper, Chicago, Ill.; Helen M. Hooper executrix of said William D. Hooper, deceased Application July 16, 1945, Serial No. 605,203

5 Claims. (Cl. 249—63)

The invention relates to an automatic device for filling a container with a predetermined weight of material.

It is an object of the invention to provide a device for filling a container in which the weight of the unfilled container or tare is automatically determined and in which the desired weight of liquid to be placed into the container is automatically measured.

It is a further object of the invention to provide an electrically controlled device which will accurately set a weighing scale for empty drums of different tare and then accurately fill each drum with an identical quantity of fluid or other material.

Further objects and advantages will be apparent from the following description and drawings appended thereto.

In the invention, in which like reference characters refer to like parts:

Figure 1:
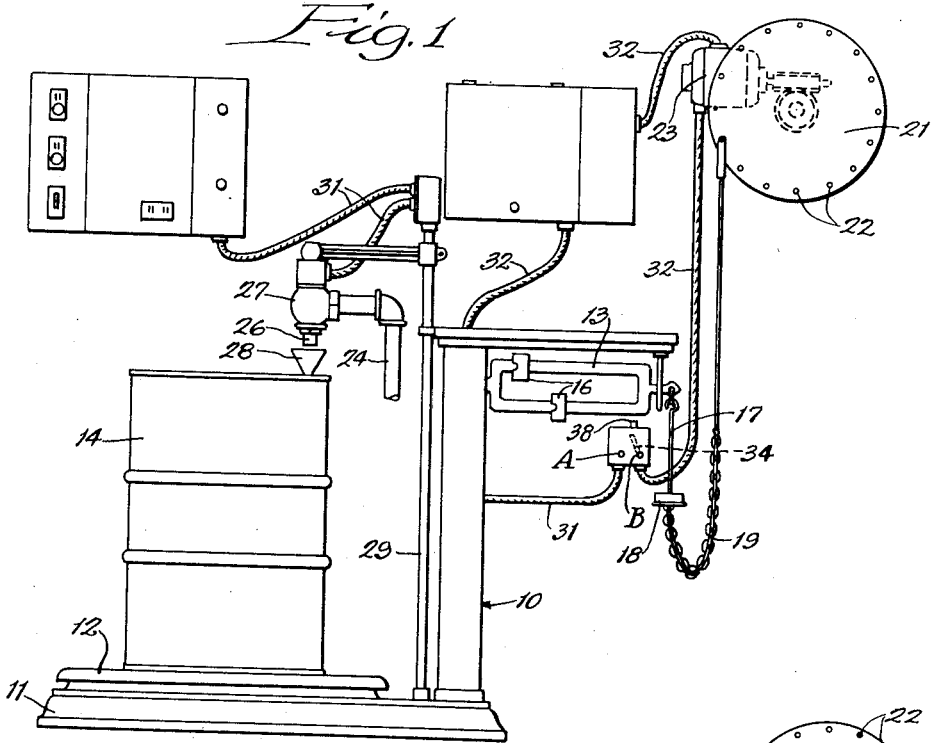
Fig. 1 is an elevational view of the preferred embodiment of the invention.

In the preferred embodiment of the invention illustrated in the drawings, the container filling device 10 comprises a conventional platform scale 11 having platform 12 which actuates scale beam 13 when a container 14 or other object is placed on the platform. The scale beam 13 is supplied with riders 16 of conventional type which may be adjustably positioned on the beam to balance a given weight on the platform.

Secured to one end of the beam is the spindle 17 which terminates in a plate 18 upon which other weights may be placed. A chain or cable serving as a flexible weight 19 is secured to the spindle and to the reel 21. The reel may comprise a disc having a series of pins on its peripheral portion for detachably securing the flexible weight 19. The reel 21 is driven by electric motor 23.

Supply line 24 is provided adjacent the scale 11 for supplying liquids or other materials to the container 14. The flow of these materials through supply line 24 and through outlet 26 is controlled by electric valve 27. Funnel means 28 may be used to direct the materials into container 14.

The wiring of the circuits by which electric valve is operated is contained in pipe 29 and cables 31. The wiring of the circuits for operating the electric motor 23 and reel 21 is contained in cables 32.

A manually operable selective switch 33 is attached to the scale adjacent the beam 13 and includes terminals A and B. When the manual switch lever 34 provides contact with terminal A of the switch, the circuit operating the electric valve is closed when the scale beam is in its lower position. Similarly, when lever 34 closes the contact with terminal B of the switch, the circuit operating the electric motor 23 is closed when the scale beam is in its lower position. When the scale beam rises from its lower position either of these respective contacts is thereby broken, cutting off the electric valve 27 or the electric motor 23. Similarly if the switch lever 34 is in intermediate or neutral position between the contacts, no current will flow therethrough.

Figure 2:
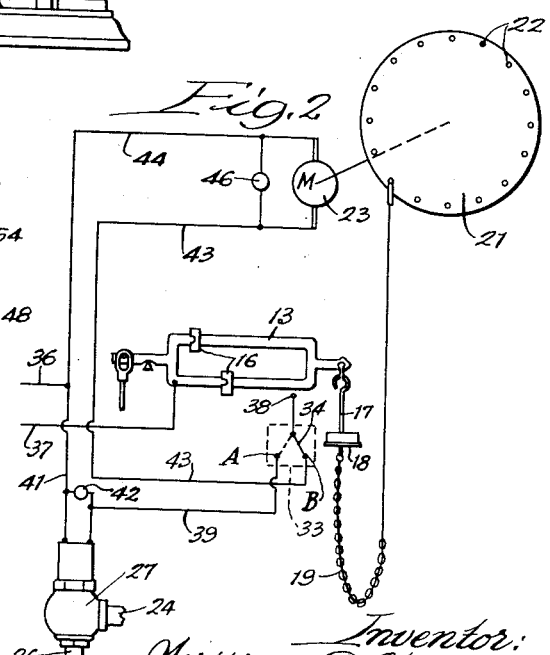
Fig. 2 is a diagrammatical view of the electrical circuits utilized in the preferred embodiment of the invention.

The electrical circuit for automatically determining the weight of the empty container and setting the scale for the tare so determined and for controlling the valve which measures the weight of the liquid or other material supplied to the container is diagrammatically shown in Fig. 2. The current is supplied to lines 36 and 37, line 37 being connected to scale beam 13. Contact point 38 of switch 33 is adapted to be in contact with the scale beam when the latter is in its lower position. From contact point 38, the circuit A for operating the electric valve 27 or the circuit B for operating the electric motor 23 may be manually selected by lever 34 of the switch by moving the lever into contact with terminal A or terminal B of the switch.

In circuit B, line 43 is connected to terminal B of the switch and one terminal of the electric motor 23. From the other terminal of the motor, line 44 is connected to power line 36. When lever 34 is in contact with terminal B of the switch, the circuit operating the electric motor 23 is closed when beam 13 is moved to its lower position. Signal 46 may be connected to lines 43 and 44 to indicate the operation of the electric motor. Signals 42 and 46 may comprise electric lights, buzzers, bells, or the like.

In circuit A, line 39 leads to one terminal of the electric valve 27. From the other terminal of the valve, line 41 leads to power line 36. When lever 34 is in contact with terminal A of the switch, the movement of beam 13 to its lower position closes circuit A, thereby opening electric valve 27 to permit the material supplied by pipe 29 to enter the container. To indicate the closing of circuit A, signal 42 may be connected to lines 39 and 41.

While the electrical circuits here used have been shown as simple power circuits, obviously they may be varied and the low voltage control circuits used with relays and relay operated switches to control the power circuits by which the motor 23 and the electric valve 27 are brought into operation.

Method of operation

A container to be filled is placed upon the platform 12. The riders 16 are moved outwardly on the beam to a point where the can, with the flexible weight 19, overbalance the weight of the container and the beam is thus moved to its lower position so that when the switch 33 is operated a circuit will be established.

In order to set the scale to compensate for the tare of the container of the platform, lever 34 is swung from its neutral position into contact with terminal B, thereby energizing the electric motor 23. The reel 21 is slowly rotated and lifts the flexible weight 19 until the weight is sufficiently shortened by its elevation to bring the scale into balance. As the scale is balanced the beam 13 rises and breaks the contact, deenergizing the electric motor and halting the movement of the reel.

Thereupon the operator swings the manual lever 34 either into neutral position or into the filling position by which circuit A is closed.

Figure 3:
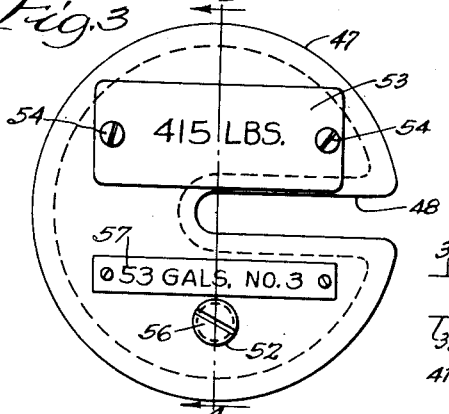
Fig. 3 is a plan view of a weight element used in conjunction with the embodiment of the invention illustrated in Figs. 1 and 2.

The operator then selects a weight of the type shown in Fig. 3, which has been prepared to counterbalance a fixed volume of the material to be measured into the container 14. This weight is hung upon the spindle 17 and lowers the beam 13 into its lower position by which the switch 33 is closed except for the operation of the manual lever 34.

Then the operator, if he as not swung the manual lever 34 into position to close contact A prior to hanging the weight upon the spindle 17, swings the lever 34 to close circuit A. By means of the electric valve 27 the material begins to flow into the container until the predetermined weight or volume fixed by the weight upon the spindle has run into the container. When the predetermined weight has run into the container the scale beam 13 rises, opens the switch, deenergizes the electric valve 27. The manual lever 34 is then swung into neutral position and the filled container removed from the platform.

In order to reset the reel so that the flexible weight 19 may again be adjusted for another drum which, because of manufacturing tolerances will practically invariably be of a different weight, the upper end of the flexible weight may be lifted from the pin 22 upon which it is suspended from the reel 21 and then attached to one of the lower pins to provide a lengthened portion of the flexible weight.

The weight

Figure 4:
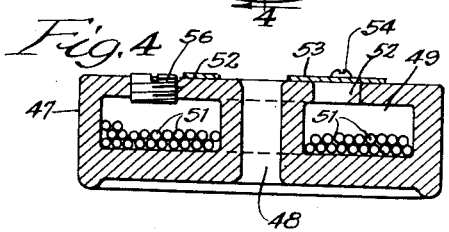
Fig. 4 is a sectional view taken on line 4—4 of Fig. 3.

A weight element that is unusually suitable for use with the container filling device is shown in Figs. 3 and 4. The weight comprises a metallic casing 47 substantially in the form of a hollow interior. Channel 48 is provided in the casing to facilitate engagement of the weight on spindle 17. Chamber 49 is provided in the interior of the casing for containing suitable weight particles such as lead shot 51. The shot is supplied to the interior of the casing through orifice 52. In the preferred embodiment, orifice 52 is closed by means of plate 53 secured to the casing by fastening means 54. The weight of the desired amount of material to be supplied to container 14 may be imprinted upon the upper surface of plate 53, or the weight may be marked with the legend 57 reading directly in terms of volumetric measurement. The weight is easily adjusted to compensate for materials of different specific gravity by addition or removal of shot 51.

In a modified form of weight, the orifice 52 is closed by means of plug 56 which is engaged in the orifice by a threaded connection or the like.

The above detailed description is given for purposes of illustration and the invention is to be limited only by the scope of the appended claims.

I claim:

1. A container filling device comprising a balance responsive to a container placed thereon, a flexible weight secured to the balance, an electrically operated means to vary the length of the flexible weight, means to supply material to fill the container on the balance, an electrically operable valve to control the flow of material into the container, a selective switch to initiate operation of the electrically operated reel or valve respectively, and switch means responsive to movement of the balance to stop operation of the electrically operated reel and valve respectively.

2. A container filling device comprising a balance responsive to a container placed thereon, a movable counterpoise secured to the balance and adapted to vary its capacity, electrical means to move the counterpoise, means to supply material to fill the container on the balance, an electrically operated valve to control the flow of material into the container, a selective switch to initiate operation of either of said electrical means, and switch means responsive to movement of the balance to stop operation of such means.

3. A container filling device comprising a platform scale having a movable scale beam adapted to be actuated by a container on the platform, a reel driven by an electric motor, a flexible weight secured to the scale beam and to the reel, a material supplying means controlled by an electric valve, switch means selectively to energize the electric motor or the electric valve and means responsive to the movement of the beam to interrupt the supply of electricity to the motor and valve respectively.

4. A container filling device which comprises a platform scale having a movable scale beam adapted to be actuated by a container on the platform, a lifting means driven by an electric motor, a flexible weight secured to the scale beam and to the lifting means, a material supplying means controlled by an electric valve, and means selectively to energize and deenergize the electric motor or the electric valve and responsive to movment of the beam, said electric motor when energized causing an adjustment of the scale beam to the weight of the container placed on the platform, said electric valve when energized causing a material to be supplied to the container.

5. In a container filling device having a balance responsive to the weight of a container placed thereon and to the contents thereof, the combination of, a movable counterpoise secured to the balance, electrical means to move the counterpoise, means to supply material to fill the container on the balance, an electrically operated valve to control the flow of material into the container, and switch means responsive to movement of the balance to control said electrical means to compensate for the weight of the container and to control said electrically operated valve to fill the container with a predetermined amount of material.

WILLIAM D. HOOPER.

REFERENCES CITED

The following references are of record in the file of this patent:

UNITED STATES PATENTS

| Number | Name | Date |
| --- | --- | --- |
| 70,531 | Comstock | Nov. 5, 1867 |
| 607,476 | Richards | July 19, 1898 |
| 1,523,511 | Bryce | Jan. 20, 1925 |
| 1,726,931 | Snelling | Sept. 3, 1929 |
| 1,773,946 | Butler | Aug. 26, 1930 |
| 2,004,034 | Cadiet | June 4, 1935 |
| 2,387,894 | Fannin | Oct. 30, 1945 |

FOREIGN PATENTS

| Number | Country | Date |
| --- | --- | --- |
| 816,908 | France | May 10, 1937 |